United States Patent [19]

Miyatake et al.

[11] 4,400,722
[45] Aug. 23, 1983

[54] OPTICAL CONFIGURATION FOR PROJECTION TELEVISION APPARATUS

[75] Inventors: Yoshito Miyatake, Moriguchi; Yoshitomi Nagaoka, Neyagawa; Yasuo Nakajima, Hirakata, all of Japan

[73] Assignee: Matsushita Electric Industrial Co., Ltd., Osaka, Japan

[21] Appl. No.: 261,136

[22] Filed: May 4, 1981

[30] Foreign Application Priority Data

May 7, 1980 [JP] Japan .................................. 55-60889

[51] Int. Cl.³ .............................................. H04N 9/31
[52] U.S. Cl. ....................................... 358/60; 358/55; 358/64
[58] Field of Search ....................... 358/56, 55, 60, 64; 350/172, 174

[56] References Cited

U.S. PATENT DOCUMENTS 2,589,930 3/1952 Dimmick et al. ...................... 358/55
2,642,487 6/1953 Schroeder .............................. 358/60

Primary Examiner—Richard Murray
Attorney, Agent, or Firm—Wenderoth, Lind & Ponack

[57] ABSTRACT

A projection television apparatus which has three monochromatic cathode-ray tubes, two type of dichroic mirrors, and a lens. Red, green and blue images from the three tubes are combined into the color image by the two types of dichroic mirrors and the resulting image is enlarged and projected on the screen by one lens. The two types of dichroic mirrors are crossed at a right angle in the shape of an "X". Each type of dichroic mirror is split in two through the line of intersection and the two parts of the respective dichroic mirrors of each type have different transmission characteristics, so that color shading is improved.

5 Claims, 6 Drawing Figures

OPTICAL CONFIGURATION FOR PROJECTION TELEVISION APPARATUS

BACKGROUND OF THE INVENTION

1. Field of the Invention

The present invention relates to a projection television apparatus, and more particularly to an apparatus which combines television images from three monochromatic cathode-ray tubes into the color image by dichroic mirrors and projects the resulting color image on the screen through a lens.

2. Description of Prior Art

In order to provide a large-picture television apparatus, many types of projection television apparatuses have been proposed. There has been proposed a projection television apparatus as shown in FIG. 1, which illustrates the structure of the main block. The outline of the structure and the principle of this type of apparatus is described below. The main block consists of three monochromatic cathode-ray tubes (1R), (1G) and (1B), two dichroic mirrors (2R) and (2B), and a lens (3). The three tubes (1R), (1G) and (1B) project red, green and blue images, respectively. One dichroic mirror (2R) is a red-type dichroic mirror from which red light is reflected and which green and blue light passes through. The other dichroic mirror (2B) is a blue-type dichroic mirror from which blue light is reflected and which red and green light passes through. The red tube (1R) and the blue tube (1B) are placed on opposite sides of the green tube (1G) in a pattern corresponding to the character "T", with their faceplates (4R), (4G) and (4B) close to each other. In the space shaped like a rectangular parallelepiped formed by the faceplates (4R), (4G) and (4B) of the three tubes, are positioned the two dichroic mirrors (2R) and (2B) which are crossed at line 5 at a right angle to each other when viewed from the edges thereof and with the surfaces of the plates facing the tubes. The angle between a perpendicular to the surface of a dichroic mirror and an optical axis of a tube directed thereat is 45°. The lens (3) is placed on the axis of the green tube (1G), and the red and blue tubes are opposed and coaxial, with the axes of the three tubes meeting at the crossing line 5 of the mirrors so that the dichroic mirrors (2R) and (2B) are surrounded by the tubes (1R), (1G) and (1B), and the lens (3). Employing such apparatus as shown in FIG. 1, the red, green and blue images from the three tubes (1R), (1G) and (1B) are combined into the color image by the dichroic mirrors (2R) and (2B), and the resulting color image is enlarged and projected on a screen (not shown) by the lens (3).

The apparatus shown in FIG. 1 has the following advantages because the optical axis of the red, green and blue light-beams projected from the lens (3) are in accord.

1. The projection distance from the lens (3) to the screen can be varied simply by shifting the lens (3) back and forth.

2. Because each optimum image of red, green and blue can be adjusted to agree with the others on the screen, this apparatus provides a high-resolution image over the entire screen area.

3. Because the shape of the image of each color projected on the screen is similar to the image from the corresponding tube (1R), (1G) and (1B), circuits for convergence adjustment are not necessary for this apparatus in principle. Even if the convergence adjustment is necessary, it is easy and convergence can be fully achieved.

4. Even if using a highly-directional screen, observers never feel color-change due to moving their observation position relative to the screen.

On the other hand, this apparatus shown in FIG. 1 has a weak point as follows. When the tubes (1R), (1G) and (1B) are driven so as to display uniform-brightness images, a phenomenon that the color is dependent on the location in a horizontal or vertical direction on the screen is observed (this is called so-called color shading). The extreme of this phenomenon is observed when using a lens with a small F-number and when using a wide angle lens.

This phenomenon can be illustrated as follows.

FIGS. 2a and 2b show examples of the relation between the transmission coefficient and the wavelength of a ray of light, for the red-type dichroic mirror (2R) and the blue-type dichroic mirror (2B), respectively. The parameter in these figures is the angle of incidence $\theta_i$. Curves (R), (G) and (B) drawn by dashed lines show the emitting spectrums of the phosphors used on the tubes (1R), (1G) and (1B), respectively. As can be seen from FIGS. 2a and 2b, a cutoff wavelength (a cutoff wavelength is defined here as the wavelength where the transmission coefficient is 50%) depends on the angle of incidence $\theta_i$. As the angle of incidence $\theta_i$ increases, the cutoff wavelength becomes shorter. The relation between the reflectivity and the wavelength is almost the same as that obtained when the above graph is turned upside-down, and the longitudinal axis represents the the reflectivity (in FIGS. 2a and 2b above).

It is seen from FIGS. 2a and 2b that when the cutoff wavelength shifts, the transmission coefficient or reflectivity of the dichroic mirrors (2R) and (2B) changes at near the cutoff wavelength, so that the light intensity of the transmitted ray or the reflected ray changes. Consider the characteristics of the red-type dichroic mirror (2R), assuming that the cutoff wavelength of the red-type dichroic mirror (2R), for $\theta_i=45°$, is between the red emitting spectrum (R) and the green emitting spectrum (G), as shown in FIG. 2a. For $\theta_i=30°$, the cutoff wavelength gets close to the red emitting spectrum (R), and the light intensity of the red reflected ray becomes weaker than the for $\theta_i=45°$, although the light intensity of the green transmitting ray doesn't change very much. And also for $\theta_i=60°$, the cutoff wavelength gets close to the green emitting spectrum (G), and the light intensity of the green transmitting ray becomes weaker than for $\theta_i=45°$, although the light intensity of the red reflected ray doesn't change very much. The blue-type dichroic mirror (2B) causes a similar phenomenon.

It is also seen from FIGS. 2a and 2b that changes of the angle of incidence $\theta_i$ cause a change of the transmission coefficient at some wavelength, so that the light intensity of the transmitted ray or the reflected ray from the dichroic mirrors (2R) and (2B) is changed.

FIG. 3 shows the brightness distribution of the red, green and blue images on the screen through a line perpendicular to the line of intersection (5) as shown in FIG. 1. The brightness of each color decreases from the center toward the right end and the left end. This is because the light beam through the lens (3) becomes thin as the field angle increases. The curves shown in FIG. 3 are not symmetric with respect to the right side and the left side. This is because the angles of incidence on the dichroic mirror are different on the right side and left side, so that this difference causes the difference of both the cutoff wavelength and the transmission coefficient between the right side and the left side. Comparing the brightness distributions of each color, it is seen that the distributions of red and blue have the same tendency, but the distribution of green has the opposite tendency to that of red and blue, and that the brightness ratios of red, green and blue depend on the location. The brightness ratio is defined as the ratio of brightness of one color in question to total brightness of the three colors. The difference of the brightness ratios becomes greater toward the periphery of the projected image, which causes the color-shading phenomenon.

As a method that alleviates the color shading problem mentioned above, there is a method of displaying images, whose brightness distributions are dependent upon the location in the horizontal or vertical direction, on three tubes (1R), (1G) and (1B), so that the brightness ratios are kept uniform over all areas of the screen. According to this method the color shading can be considerably improved. But this method is undesirable, because overload occurs on the area of the tubes (1R), (1G) and (1B) where high-brightness images are displayed. This overload causes a decrease of the life of the tubes (1R), (1G) and (1B). And also this method is undesirable, since the area of the tubes (1R), (1G) and (1B) where low-brightness images are displayed.

BRIEF SUMMARY OF THE INVENTION

It is an object of the present invention to provide a projection television apparatus capable of achieving improved color shading, without altering the circuit systems, and without adding appreciably to the cost.

The above and other related objects and advantages of the present invention will appear more fully hereinafter from a consideration of the following description taken in connection with the accompanying drawings wherein one embodiment is illustrated by way of example.

DETAILED DESCRIPTION OF THE PREFERRED EMBODIMENTS

Figure 1:
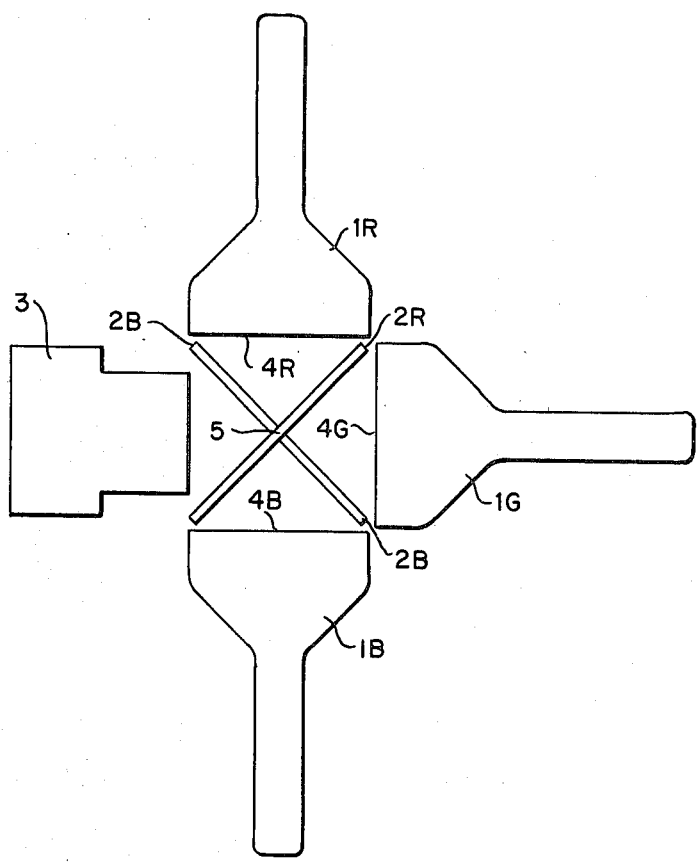
FIG. 1 is a diagrammatic cross-sectional view of a main block of a prior art apparatus.
Figure 2A:
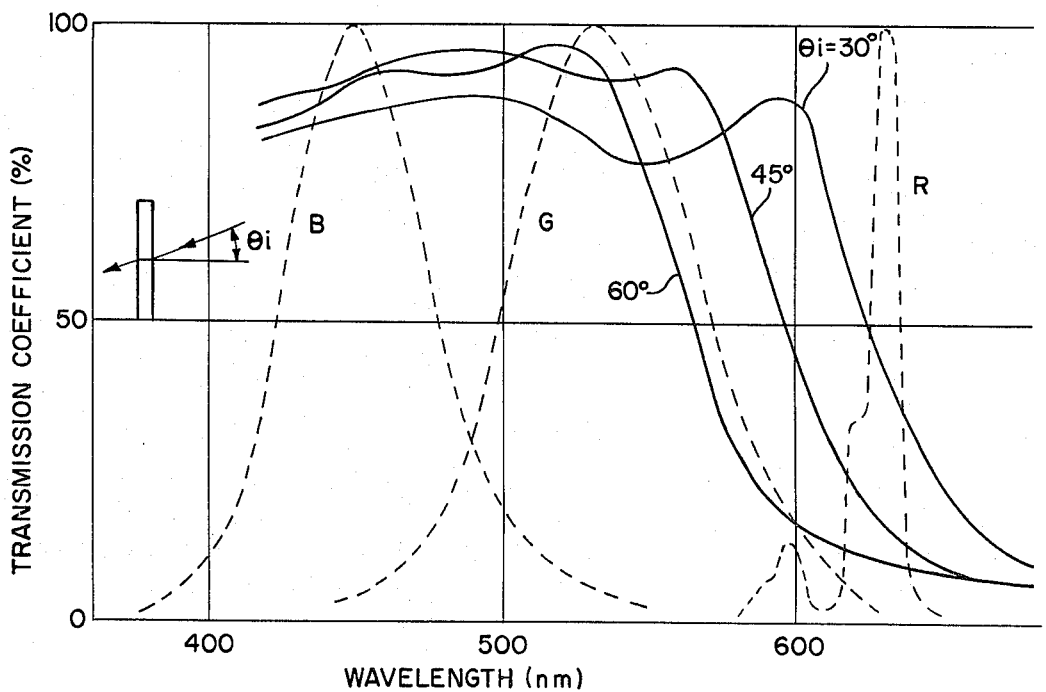
FIGS. 2a and 2b are diagrams of the transmission characteristics of a red-type dichroic mirror and a blue-type dichroic mirror, respectively.
Figure 2B:
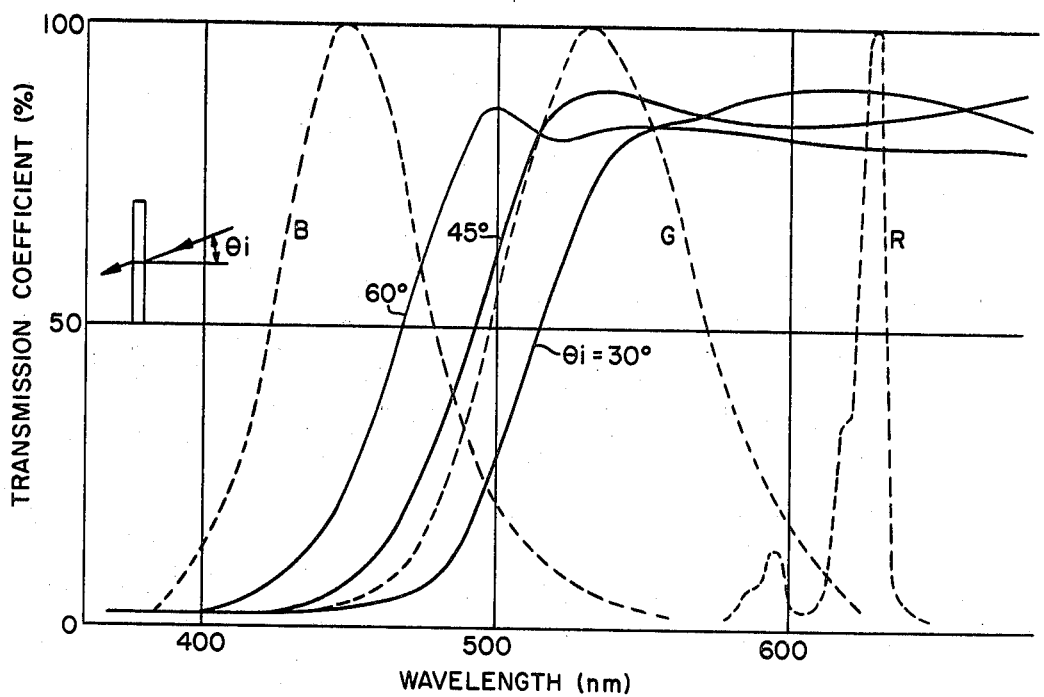
Figure 4:
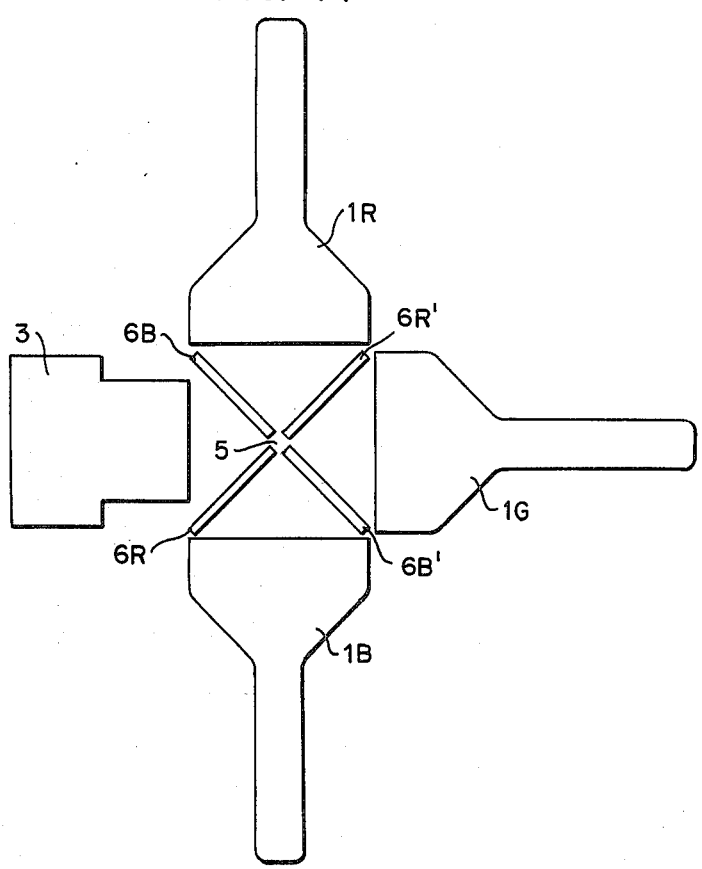
FIG. 4 is a diagrammatic cross-sectional view of a main block of the apparatus according to the present invention.

FIG. 4, which is quite similar to FIG. 1 except for the dichroic mirrors, shows an example of the structure of the main block of an embodiment of the apparatus according to the present invention. (6R) and (6R') are parts of the red-type dichroic mirror, which are separated at the line of intersection (5), and the cutoff wavelengths of which are different. The dichroic mirror part (6R') which is farther from the lens (3) has a longer cutoff wavelength than the dichroic mirror part (6R) which is placed nearer the lens (3). (6B) and (6B') are the parts of the blue-type dichroic mirror which are separated at the line of intersection (5), and the cutoff wavelengths of which are different. The dichroic mirror part (6B') which is placed farther from the lens (3) has a longer cutoff wavelength than the dichroic mirror part (6B) which is placed nearer the lens (3). Additionally, the angle of incidence at which the transmission coefficient of the dichroic mirror parts (6R') and (6B') is a maximum at the wavelength of green is greater than the angle of incidence at which the transmission coefficient of the dichroic mirror parts (6R) and (6B) is a maximum at the same wavelength. This is because, considering the many rays of light from the tubes (1R), (1G) and (1B) to the lens (3), the angles of incidence on the dichroic mirror parts (6R') and (6B') are relatively greater than those on the dichroic mirror parts (6R) and (6B).

Figure 3:
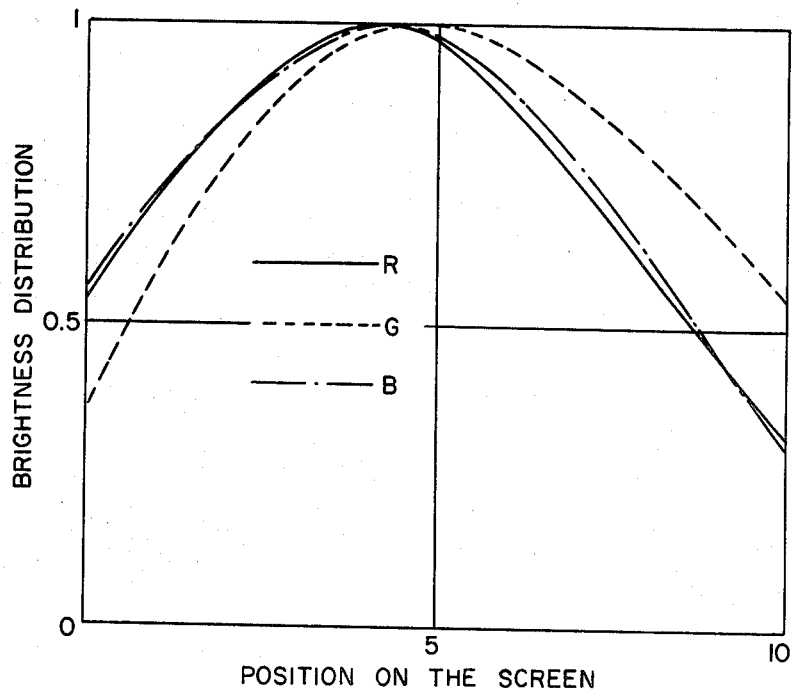
FIG. 3 is a diagram showing the brightness distribution patterns of each color on the screen, which illustrates color shading.
Figure 5:
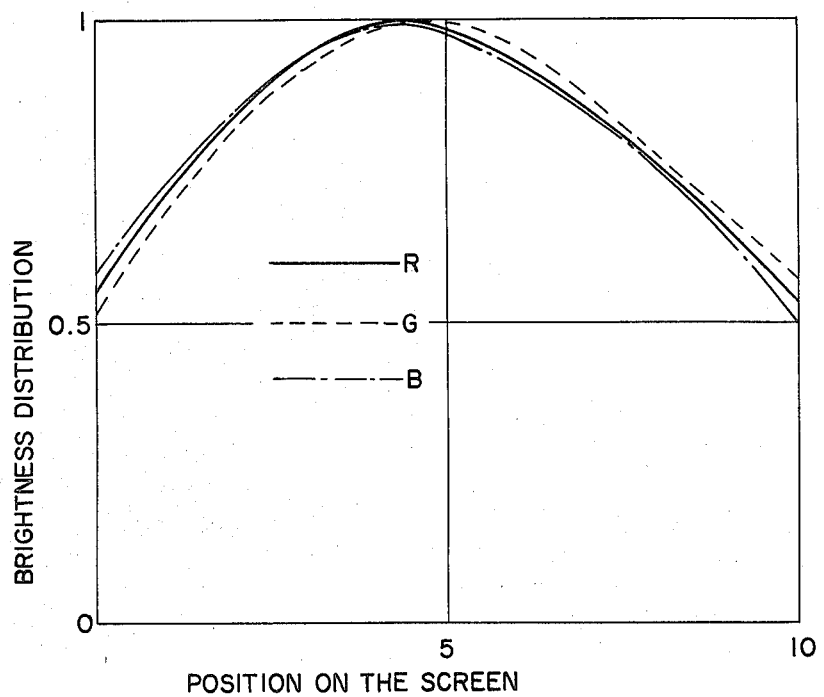
FIG. 5 is a diagram showing the brightness distribution patterns of each color on the screen, which illustrates the effect of the embodiment according to the present invention.

For whatever cutoff wavelengths and optimum angles of incidence for every dichroic mirror parts (6R), (6R'), (6B) and (6B'), the brightness distribution patterns of red, green and blue, which are measured on the screen through the line perpendicular to the line of intersection (5), can be changed as shown in FIG. 5. Compared with FIG. 3 that shows the distribution patterns of the prior art, the high-brightness side from the center shown in FIG. 3 is changed little for each color, but low-brightness side of FIG. 3 becomes brighter for each color. In addition, the brightness distribution patterns of each color become very symmetric on the right and left. Consequently the difference in the brightness ratios of the respective colors become smaller than those of FIG. 3 or is minimized, which means an improvement of the color shading. Although in FIG. 5 the brightness distribution patterns of each color are not in perfect accord, this lack of accord is not significant in practice, because it is impossible for human eyes to distinguish so small a difference of the brightness ratios of each color.

Although FIG. 4 shows an example in which the green tube is placed opposite the face of the lens (3), the red tube (1R) or the blue tube (1B) can be placed opposite the face of the lens (3) too, and a similar effect can be obtained.

Because it is necessary to cross the red-type dichroic mirror and the blue-type dichroic mirror as shown in FIG. 1, it is necessary to cut at least one of the dichroic mirrors in two at the line of intersection (5). Therefore, there is no harm in cutting both types of dichroic mirrors in two at the line of intersection (5) as shown in FIG. 4.

As described above, the present invention provides a superior effect in the improvement of the color shading, and this improvement is achieved at the same cost as the prior art apparatus, without overloading on the tubes, and without touching the circuit system.

What is claimed is:
1. A projection television apparatus comprising:
three cathode ray tubes for emitting red, green and blue images respectively and which are placed with their optical axes in a single plane at 90° to each other with the faceplates thereof adjacent each other to define a rectangular parallelepiped shaped space;
two dichroic mirrors in said space with the surfaces facing said faceplates of said tubes and in an X shaped configuration when viewed from the edges of said mirrors, each mirror reflecting a different color than the other mirror, at least one of said dichroic mirrors consisting of two small dichroic mirror parts which are separated at the line of intersection where said two dichroic mirrors cross each other, each small dichroic mirror part having a single transmission characteristic which is different from the same single transmission characteristic of the other small dichroic mirror part for minimizing the difference in brightness ratios of the respective colors transmitted; and a lens on the opposite side of said space and positioned on the optical axis of the center tube of said three tubes.

2. A projection television apparatus as claimed in claim 1 wherein the transmission characteristic of said two small dichroic mirror parts which is different is the cutoff wavelength at the same angle of incidence.

3. A projection television apparatus as claimed in claim 2 in which said small dichroic mirror part which is more remote from said lens has a longer cutoff wavelength at the same angle of incidence than said small dichroic mirror part which is nearer said lens.

4. A projection television apparatus as claimed in claim 1 wherein the transmission characteristic of said two small dichroic mirror parts which is different is the optimum angle of incidence which makes the transmission coefficient at a particular wavelength a maximum.

5. A projection television apparatus as claimed in claim 4 in which said small dichroic mirror part which is more remote from said lens has a greater optimum angle of incidence than that of said small dichroic mirror part which is nearer said lens.

* * * * *